Figure 1:
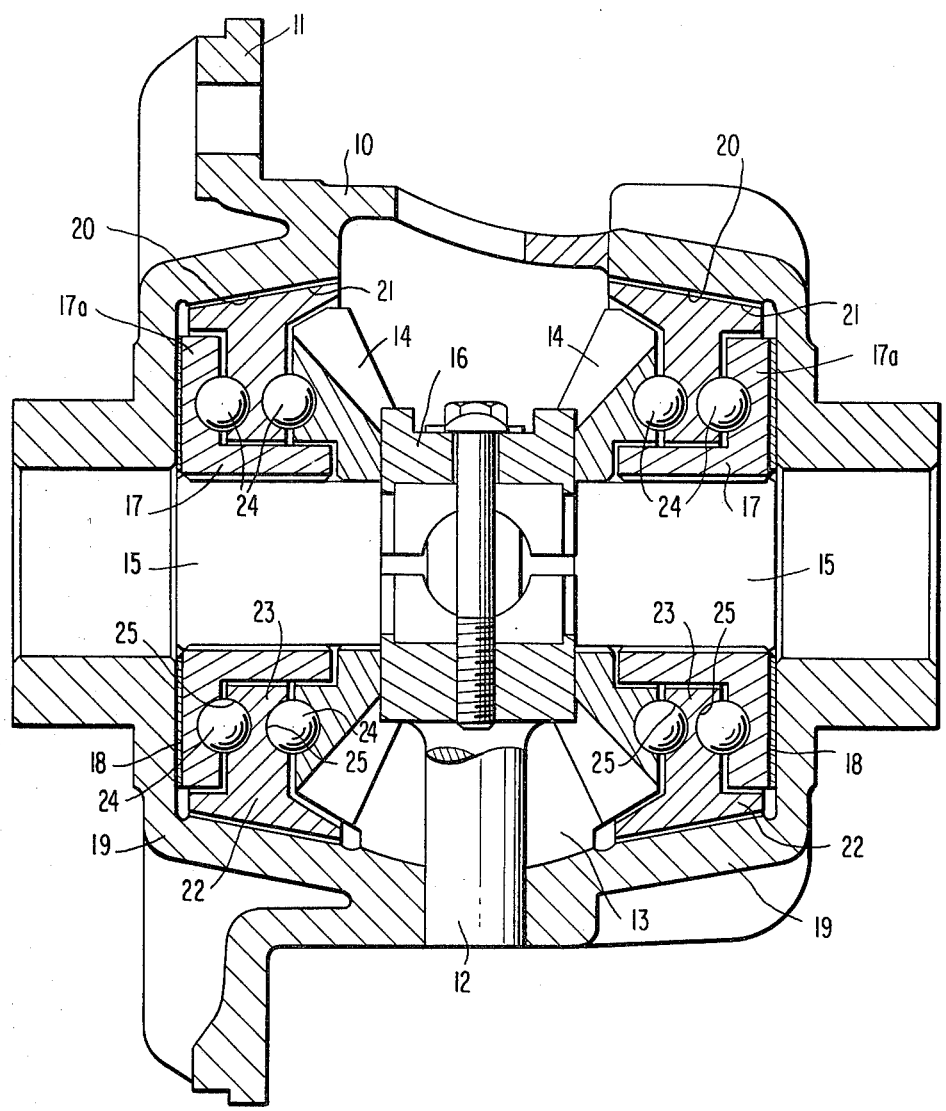

United States Patent [19]

Altmann

[11] 4,269,086
[45] May 26, 1981

[54] SELF-LOCKING DIFFERENTIAL GEAR FOR MOTOR VEHICLES, ESPECIALLY BEVEL GEAR DIFFERENTIAL GEAR

[75] Inventor: Werner Altmann, Remchingen-Nöttingen, Fed. Rep. of Germany

[73] Assignee: Daimler-Benz Aktiengesellschaft, Stuttgart, Fed. Rep. of Germany

[21] Appl. No.: 877,030

[22] Filed: Feb. 10, 1978

[30] Foreign Application Priority Data

Feb. 12, 1977 [DE] Fed. Rep. of Germany ....... 2706050

[51] Int. Cl.³ .......................... F16H 1/44; F16H 1/40
[52] U.S. Cl. ..................................... 74/711; 74/710.5; 74/713
[58] Field of Search ...................... 74/711, 710.5, 713, 74/230.17 M

[56] References Cited

U.S. PATENT DOCUMENTS

| | | | |
|---|---|---|---|
| 1,282,614 | 10/1918 | Miller | 74/711 X |
| 1,556,101 | 10/1925 | Goodhart | 74/711 |
| 1,777,024 | 9/1930 | Wildhaber | 74/711 |
| 2,187,843 | 1/1940 | Rzeppa | 74/713 |
| 2,852,952 | 9/1958 | Wolfram | 74/230.17 M |
| 3,034,367 | 5/1962 | Steuer | 74/230.17 M |
| 3,330,169 | 7/1967 | Carrico et al. | 74/711 |
| 3,474,689 | 10/1969 | Young | 74/711 |
| 3,546,968 | 12/1970 | Altmann | 74/710.5 |
| 3,572,165 | 3/1971 | Roper | 74/711 |
| 3,815,442 | 6/1974 | McAninch et al. | 74/713 X |

FOREIGN PATENT DOCUMENTS 1155889 6/1969 United Kingdom ..................... 74/711

Primary Examiner—Leslie Braun
Attorney, Agent, or Firm—Craig & Antonelli

[57] ABSTRACT

A self-locking differential gear for motor vehicles with locking devices for automatically locking the differential gear, which are coordinated to each driven gear; a mechanism in the form of a torque scale is thereby coordinated to each driven gear which in case of a force equilibrium, retains the respective locking device in its ineffectual position and transfers the same automatically into its effective position during a disturbance of this equilibrium.

12 Claims, 2 Drawing Figures

U.S. Patent    May 26, 1981    4,269,086

SELF-LOCKING DIFFERENTIAL GEAR FOR MOTOR VEHICLES, ESPECIALLY BEVEL GEAR DIFFERENTIAL GEAR

The present invention relates to a self-locking differential gear for motor vehicles, especially to a bevel gear differential gear with locking devices for the automatic locking of the compensating or differential action, which are coordinated to each driven or output gear.

Self-locking differential gears of the aforementioned type are known in many constructions in the prior art. The locking action is thereby controlled frequently in dependence on the torque, whereby the engagement of the locking devices is controlled for the most part by means of inclined surfaces and by means of corresponding spring forces. These arrangements have, for the most part, a quite complicated construction, and they are also adversely affected by friction at the inclined surfaces so that by no means do they always function completely satisfactorily.

The present invention is therefore concerned with the task to avoid the aforementioned disadvantages. Consequently, a self-locking differential gear having a simple construction is to be proposed according to the present invention which functions reliably in operation independently of the respectively prevailing friction conditions.

The underlying problems are solved according to the present invention by a mechanism (torque scale) coordinated to each driven gear, which with a force equilibrium retains the respective locking device in its ineffectual position and which automatically transfers the same into its effective position upon disturbance of the equilibrium. This principle can be applied to the most different locking devices and results—as will be indicated more fully hereinafter—in differential gears of very simple construction. The differential gears are then independent of the respectively prevailing friction conditions. For the case of a locking clutch at each driven gear, which in the engaged position then connects the driven gear with the differential gear casing, the present invention proposes that this mechanism (torque scale) is operatively connected with the movable actuating member of this locking clutch.

It is already known in the art to construct the locking clutches as cone clutches, whose fixed cone part is arranged at the differential gear housing or casing. The movable cone part is then engaged by way of the already described inclined surfaces by tooth pressure and/or torque from the driven gear against spring action. It is proposed therefor by the present invention that the movable cone part forms itself a part of the mechanism (torque scale) and is supported both with respect to the driven gear as also with respect to a thrust washer non-rotatably connected with the axle shaft by deflection devices. One embodiment of the present invention is characterized in that the movable cone part engages with an inwardly directed flange between the driven gear and the thrust washer, and in that deflection balls uniformly distributed over the circumference are arranged on both sides thereof in corresponding pockets at the flange and the thrust washer respectively at the flange and the driven gear. It is thereby further proposed according to the present invention that the two pocket rows in the flange are mutually offset in the circumferential direction. Also an arrangement along different diameters is within the purview of the present invention.

The proposals according to the present invention result in a differential gear of very simple construction, whereby frequently identical balls, respectively, other identical parts or contours facilitate the machining, respectively, the stocking and the assembly. A particularly space-saving arrangement results from the offset of the pocket rows.

Accordingly, it is an object of the present invention to provide a self-locking differential gear for motor vehicles which avoids by simple means the aforementioned shortcomings and drawbacks encountered in the prior art.

Another object of the present invention resides in a self-locking differential gear for motor vehicles which is extraordinarily simple in construction yet assures a completely satisfactory functioning thereof under all operating conditions.

A further object of the present invention resides in a self-locking differential gear for motor vehicles which operates reliably independently of the respectively prevailing friction conditions.

Still a further object of the present invention resides in a self-locking differential gear for motor vehicles whose principle of operation can be applied to the most varied locking devices without impairment of the proper functioning thereof.

Another object of the present invention resides in a self-locking differential gear of the type described above in which the machining and stocking of parts as well as assembly thereof are greatly facilitated by far-reachingly identical parts.

A further object of the present invention resides in a self-locking differential gear which is characterized by a particularly space-saving arrangement.

Figure 2:
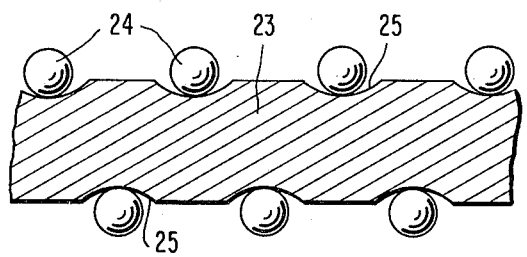

These and other objects, features and advantages of the present invention will become more apparent from the following description when taken in connection with the accompanying drawing which shows, for purposes of illustration only, one embodiment in accordance with the present invention, and wherein:

FIG. 1 is a longitudinal cross-sectional view through the differential gear housing of a differential gear according to the present invention; and FIG. 2 is a schematic view, in cross section, of a modified arrangement of the two ball rows developed in a single plane.

Referring now to the drawing wherein like reference numerals are used throughout the two views to designate like parts, according to FIG. 1, the differential gear housing or casing 10 accommodates with a flange 11 the drive bevel gear (not shown) and additionally in a known manner the spider 12, also not illustrated in detail, with the differential bevel gears 13. The latter engage with driven gears 14 which are rotatably arranged on the half-axles 15 and are axially supported with respect to a center member 16 of the spider. Each driven gear 14 is operatively connected in a manner to be described more fully hereinafter for purposes of torque transmission with an abutment 17 which is non-rotatably secured on each driven or output shaft 15, and which is axially supported with a disk portion 17a thereof possibly under interposition of a slide disk 18 or eventually even of a roller bearing at the differential gear housing 10.

A locking clutch generally designated by the reference numeral 19 is coordinated to each driven gear 14 which is constructed as cone clutch. The stationary cone surfaces are thereby formed by the axle gear housing 10 itself. The conical counter-surfaces 21 are located at a movable clutch member or part 22 which is axially displaceable within small limits.

This movable clutch member 22 belongs to the mechanism according to the present invention. It engages with an inwardly directed flange 23 between the driven gear 14 and the disk portion 17a at the abutment 17, and more particularly in such a manner that a certain axial play exists toward both sides. A number of bearing balls 24 are arranged uniformly distributed over the circumference on both sides of this flange 23, which are arranged in corresponding pockets at the flange 23 and at the disk portion 17a of the abutment 17, on the one hand, and at the driven gear 14, on the other. These pockets 25 are disposed opposite one another according to FIG. 1. However, they may also be mutually offset according to FIG. 2 so that they mutually engage into one another, so to speak of, and, as a result thereof, the flange 23 can be constructed narrower. A very space-saving arrangement results in this manner. Also, a corresponding offset in the diameter area would be feasible within the scope of the present invention.

The described installation forms a torque scale whereby the flange 23 of the movable clutch member 22 is retained in its center position, i.e., in the disengaged position of the locking clutch 20, when the torque is equal on both sides. In this condition, a quite normal differential action between the wheels on both sides is possible. The arrangement is therefore so made that the locking clutch 20 is disengaged in this equilibrium condition.

If now the equilibrium is disturbed at the mechanism (torque scale) according to the present invention, then the movable clutch member 22 is displaced correspondingly out of its center position. This may be the case, for example, when during a curve drive an additional torque is introduced at the curve outer wheel, which then further displaces the movable clutch member 22 in the disengaging direction by means of the deflection bearing balls 24 and the flange 23. The opposite occurs when at least temporarily a higher torque is introduced from the driving side, i.e., from the driven gears 14 which is the case, for example, when the respective vehicle wheel more or less loses externally the ground adherence. In this case, the higher torque displaces the movable clutch member 22 outwardly, i.e., the two cone surfaces 20 and 21 come into abutment and the locking clutch is therewith engaged. The differential gear now operates in the locked condition, i.e., a sufficient torque can now be applied onto the ground in every case by way of both wheels.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A self-locking differential gear means for motor vehicles, comprising a pair of output shaft means, a driven gear rotatably arranged on each output shaft means, locking means operatively connected to each driven gear for automatically locking the driven gear to a differential gear housing, characterized in that an abutment means is non-rotatably secured on each output shaft means for connecting each driven gear to its respective output shaft means, each of said driven gears is mounted so as to be rotatable relative to its associated abutment means, the respective locking means are disposed between said abutment means and the associated driven gear, and in that a further means is interposed between each driven gear and associated locking means and between each abutment means and associated locking means for retaining the respective locking means in an ineffectual position when a torque equilibrium exists between the driven gear and an associated output shaft means and for automatically transferring the respective locking means into an effective position upon a disturbance of the torque equilibrium.

2. A differential gear according to claim 1, characterized in that the differential gear means is a bevel gear differential gear.

3. A differential gear according to claim 1, characterized in that said further means is constructed as a torque scale means.

4. A differential gear according to claim 1, characterized in that the locking means includes a locking clutch means arranged at each driven gear, each locking clutch means includes a movable actuating member disposed between the abutment means and associated driven gear, the movable actuating member is adapted to place the locking clutch means into an engaged position so as to connect the driven gear with a differential gear housing, and in that said further means is operatively connected with the movable actuating member of said locking clutch means.

5. A differential gear according to claim 4, characterized in that the locking clutch means is constructed as a cone clutch disposed at each driven gear and includes fixed and movable cone parts, the fixed cone part is arranged at the differential gear housing, the movable cone part is arranged on the movable actuating member, and in that the further means includes deflection means supporting the movable cone part with respect to the driven gear and with respect to the associated abutment means.

6. A differential gear according to claim 5, characterized in that said deflection means are constructed as balls.

7. A differential gear according to claim 5, characterized in that the movable actuating member includes an inwardly directed flange arranged between the respective driven gear and the associated abutment means, and in that the deflection means includes deflection balls and deflection pockets arranged in the flange and the abutment means for accommodating the deflection balls, the deflection balls and the deflection pockets are uniformly distributed over the circumference of the abutment means and flange and on both sides of the flange such that the deflection balls are disposed between the abutment means and said flange and between said flange and said driven gear.

8. A differential gear according to claim 7, characterized in that the two rows of pockets in the flange are offset with respect to one another in the circumferential direction.

9. A differential gear according to claim 8, characterized in that said further means is constructed as a torque scale means.

10. A differential gear according to claim 1, characterized in that the locking means includes a cone clutch disposed at each driven gear, each cone clutch includes fixed and movable cone parts, the fixed cone part is arranged at the differential gear housing, and in that the further means includes deflection means for supporting the movable cone part with respect to the driven gear and with respect to the abutment means.

11. A differential gear according to claim 10, characterized in that the movable cone part includes an inwardly directed flange between the respective driven gear and the abutment means, the deflection means includes deflection balls and deflection pockets arranged in the flange and the abutment means for accommodating the deflection balls, the deflection balls and deflection pockets are uniformly distributed over the circumference of the abutment means and the flange and are arranged on both sides of said flange such that the deflection balls are disposed between the abutment means and said flange and between said flange and said driven gear.

12. A differential gear according to claim 11, characterized in that the two rows of pockets in the flange are offset to one another in the circumferential direction.

* * * * *